(12) United States Patent
Fukui

(10) Patent No.: US 9,060,112 B2
(45) Date of Patent: Jun. 16, 2015

(54) IMAGING APPARATUS, LIGHT EMITTING APPARATUS, AND CAMERA SYSTEM

(71) Applicant: CANON KABUSHIKI KAISHA, Tokyo (JP)

(72) Inventor: Hajime Fukui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 13/687,613

(22) Filed: Nov. 28, 2012

(65) Prior Publication Data
US 2013/0155316 A1  Jun. 20, 2013

(30) Foreign Application Priority Data
Nov. 30, 2011  (JP) .................................. 2011-262272

(51) Int. Cl.
*H04N 5/225* (2006.01)
*H04N 5/232* (2006.01)

(52) U.S. Cl.
CPC ............. *H04N 5/2256* (2013.01); *H04N 5/232* (2013.01)

(58) Field of Classification Search
CPC ... H04N 5/2354; H04N 5/2256; G03B 15/05; G03B 15/03; G03B 2215/0596; G03B 15/02
USPC ........................ 348/371; 396/56, 59, 180, 182
See application file for complete search history.

(56) References Cited

U.S. PATENT DOCUMENTS

2012/0207459 A1\* 8/2012 Clark ............................ 396/180

FOREIGN PATENT DOCUMENTS

JP  2008-102337 A  5/2008

\* cited by examiner

*Primary Examiner* — Paul Berardesca
(74) *Attorney, Agent, or Firm* — Canon U.S.A., Inc. IP Division

(57) ABSTRACT

An imaging apparatus, which can communicate with a light emitting apparatus via a radio wave communication unit using radio waves, is configured to control timing at which the imaging apparatus starts an operation corresponding to a light emission performed according to a light emission start instruction based on a first light emission delay time that the light emitting apparatus requires for the processing from completion of reception of data indicating the light emission start instruction issued from the radio wave communication unit to a start of the light emission, and a second light emission delay time required for the processing from an output of the light emission start instruction issued from a light emission start instruction unit to completion of transmission of the data indicating the light emission start instruction issued from the radio wave communication unit.

13 Claims, 9 Drawing Sheets

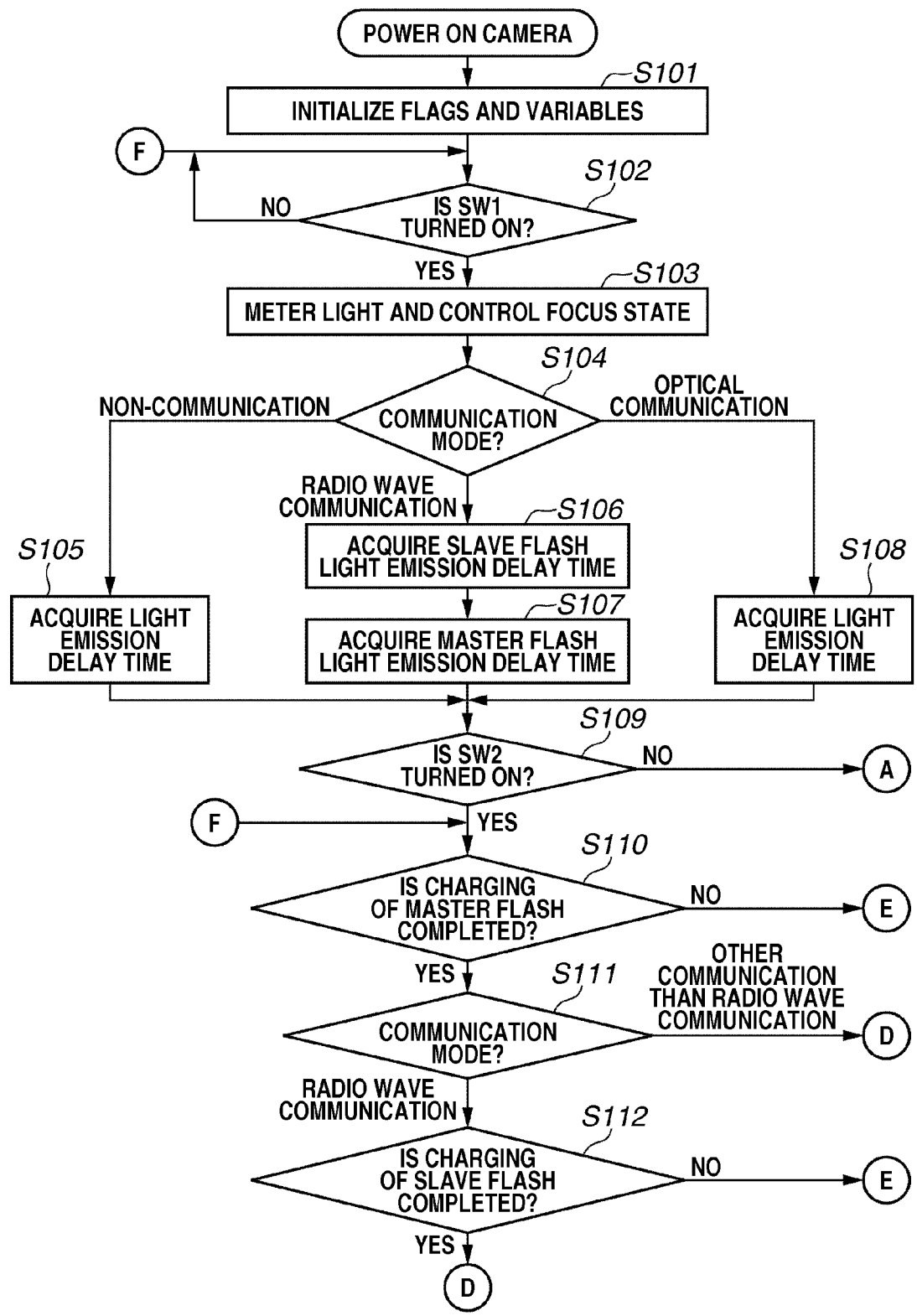

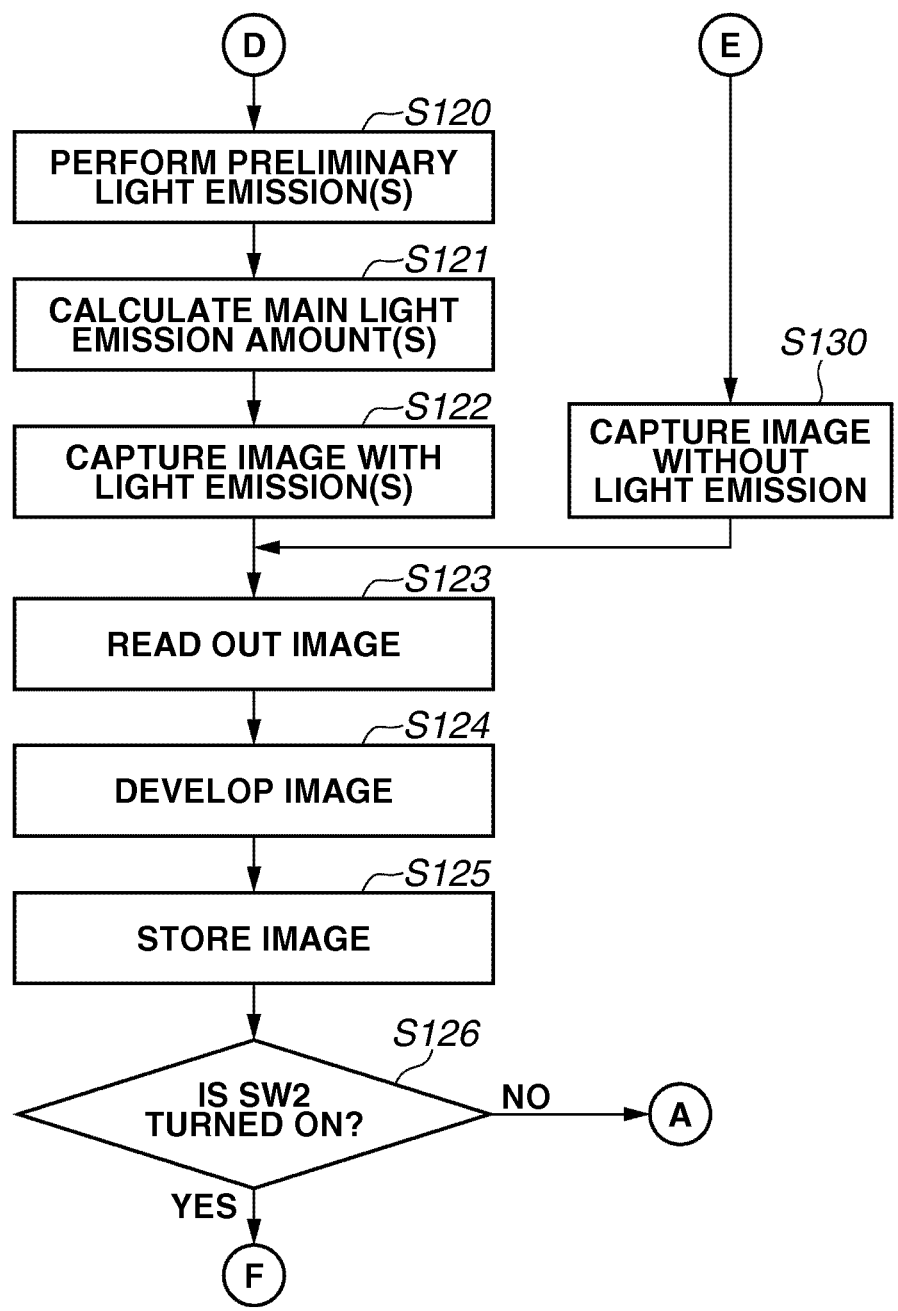

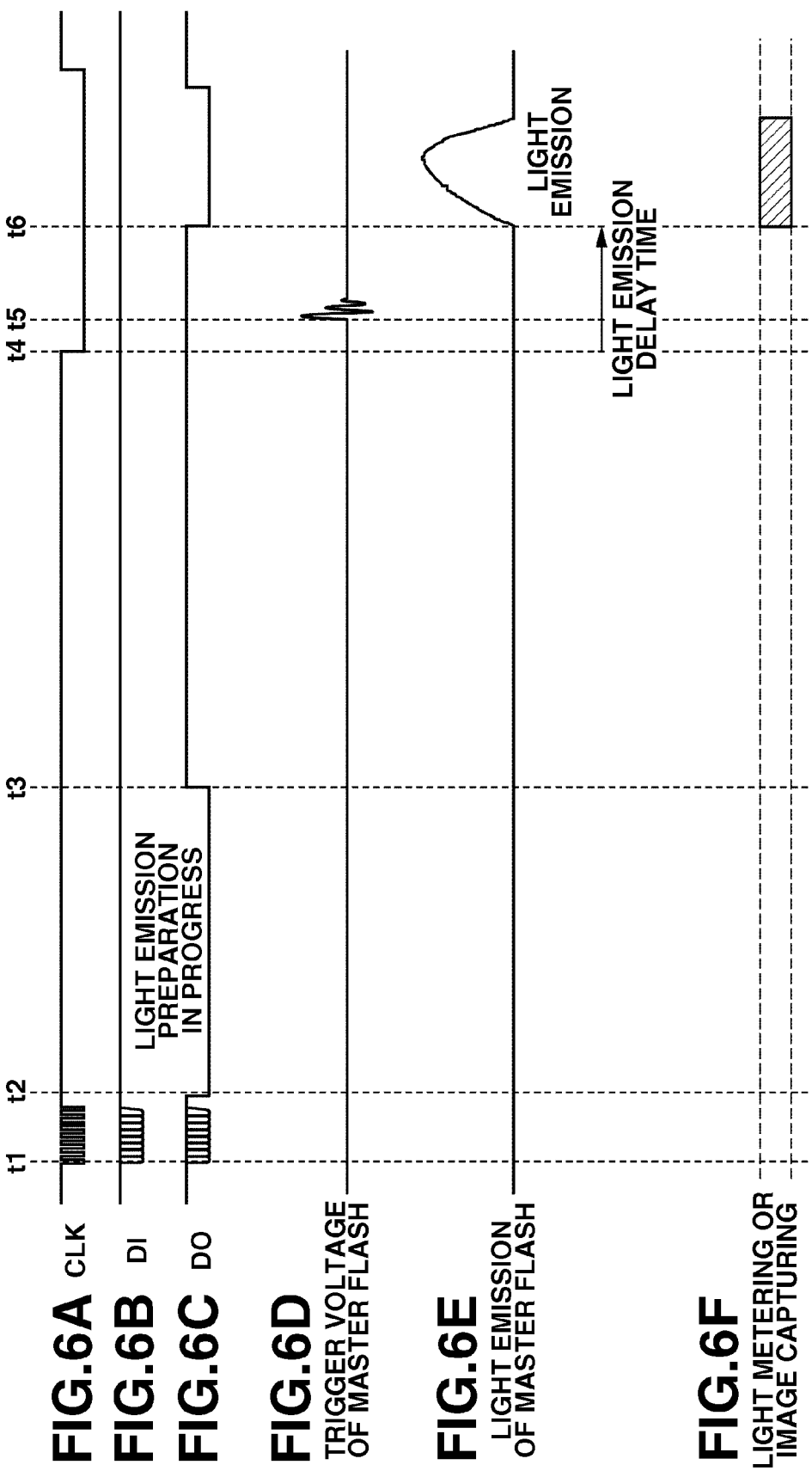

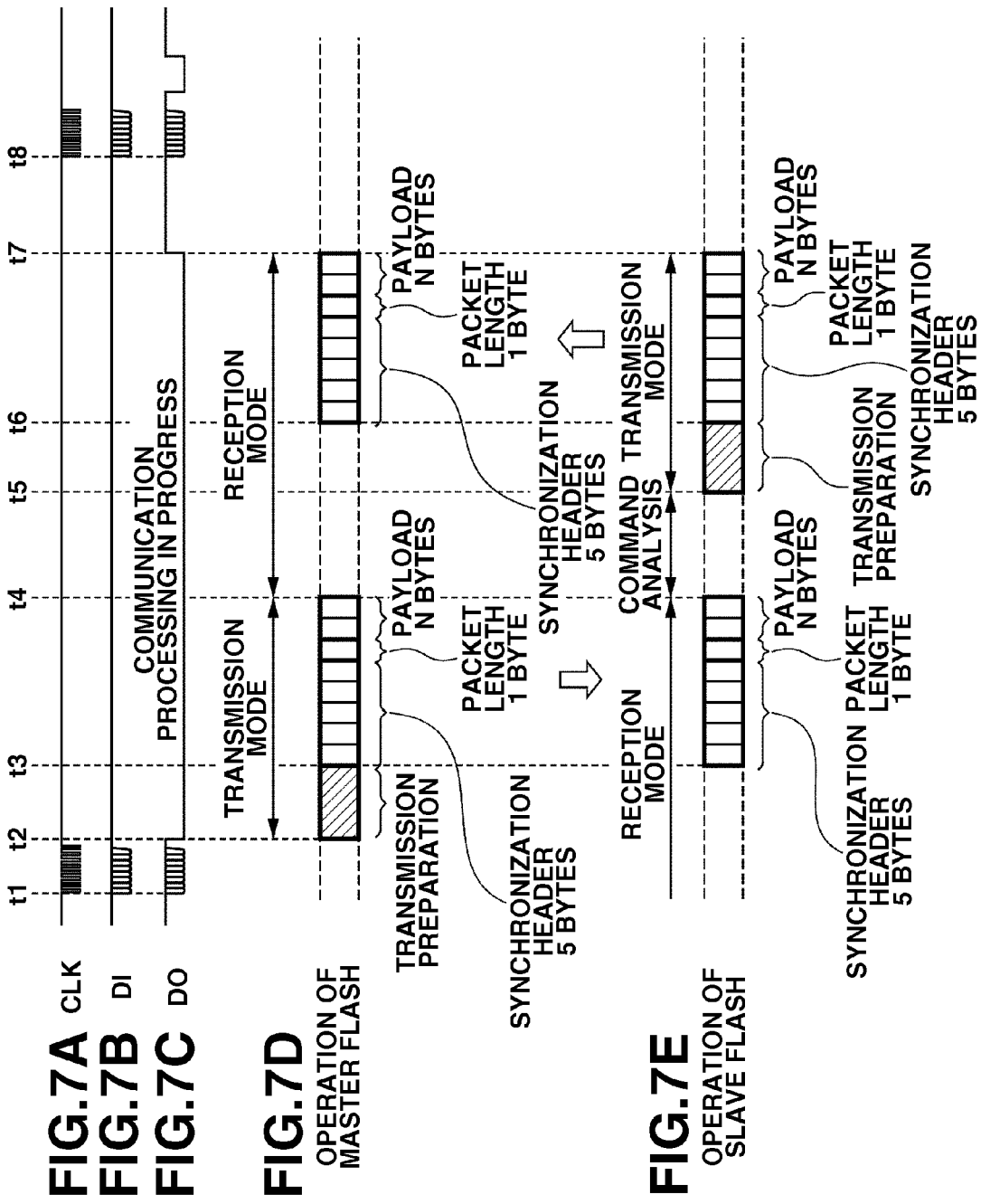

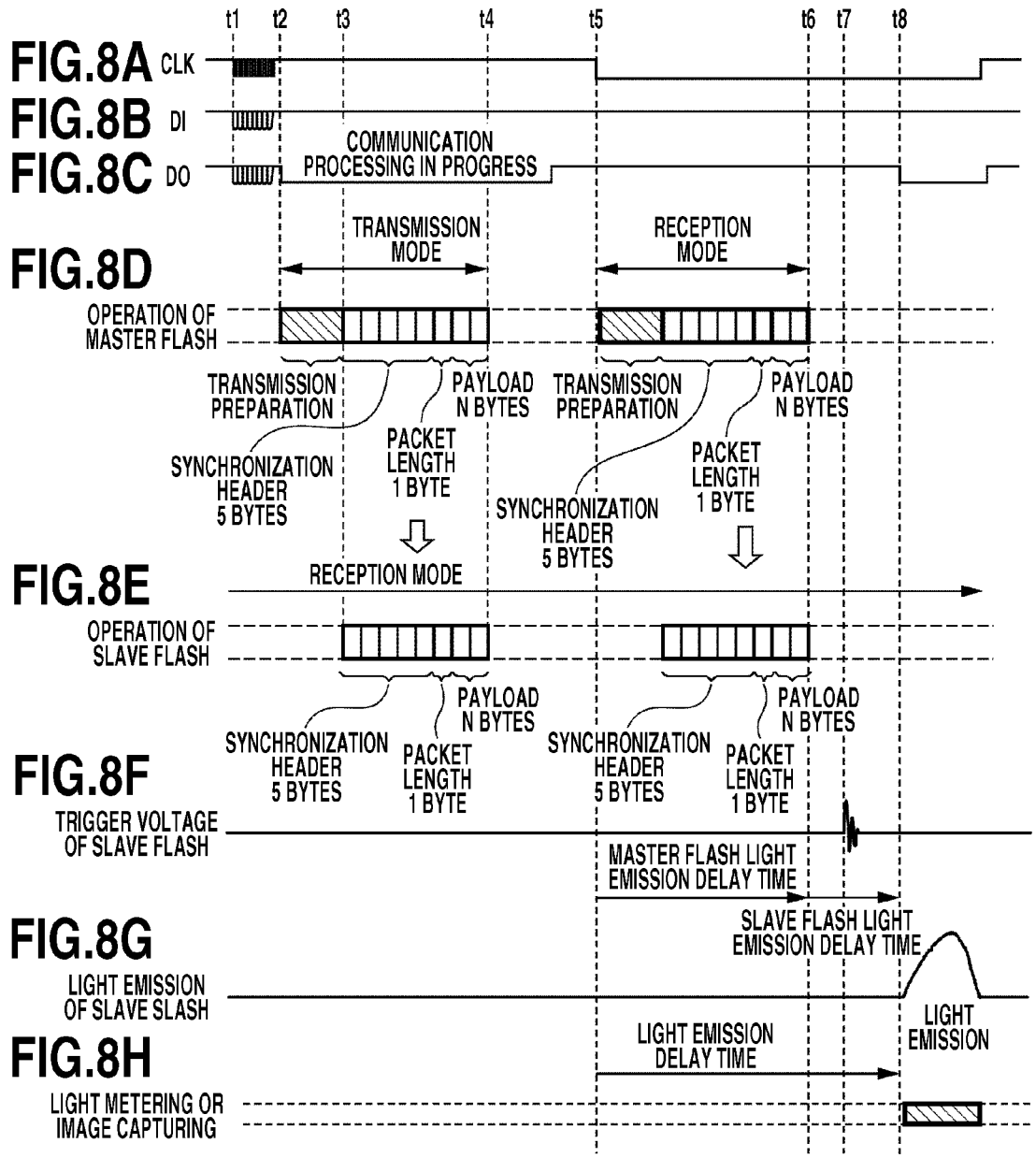

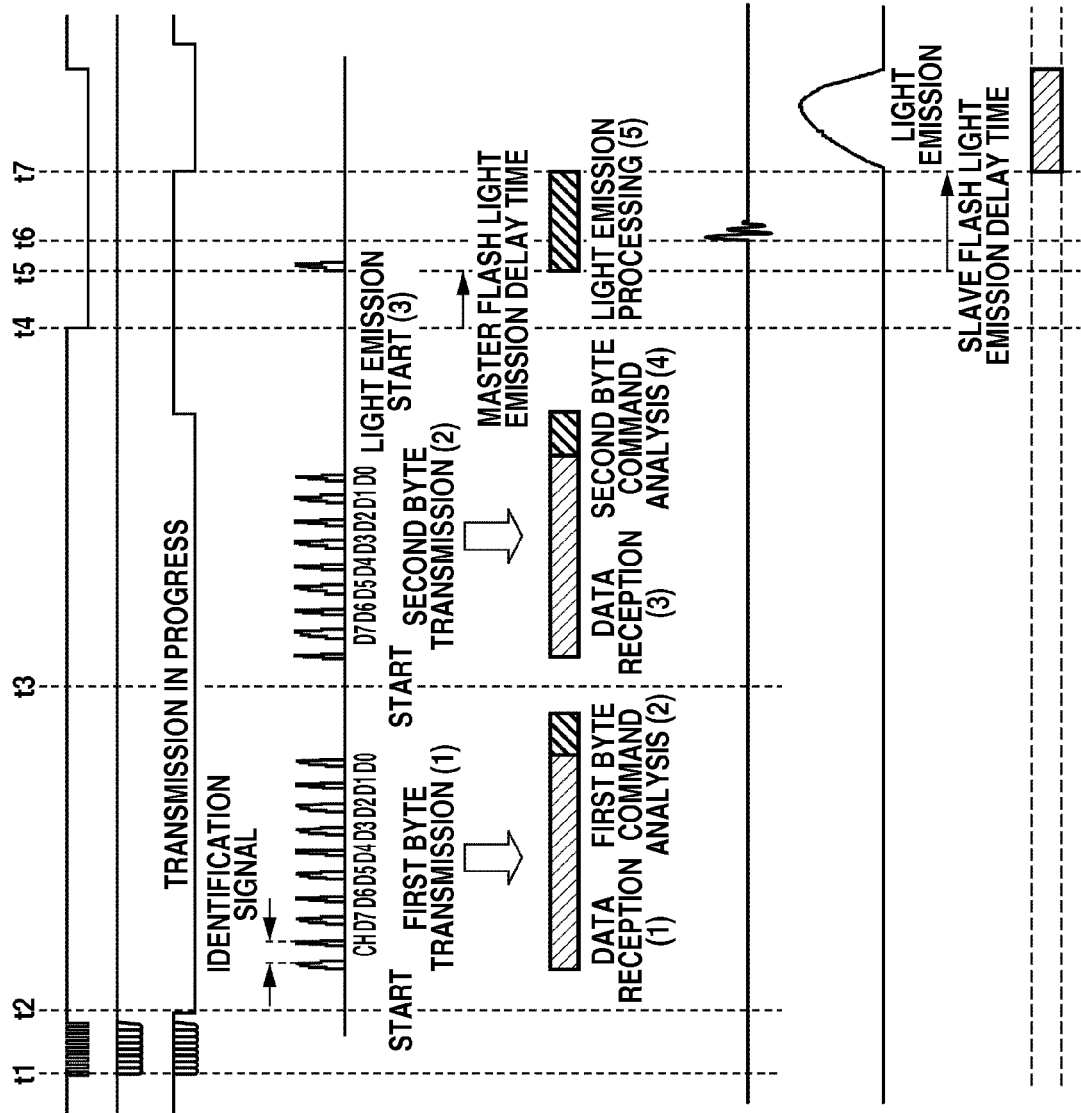

IMAGING APPARATUS, LIGHT EMITTING APPARATUS, AND CAMERA SYSTEM

BACKGROUND OF THE INVENTION

1. Field of the Invention

The present invention relates to an imaging apparatus, a light emitting apparatus, and a camera system in which the imaging apparatus and the light emitting apparatus perform wireless communication using radio waves.

2. Description of the Related Art

In recent years, a camera system has been developed that wirelessly connects an imaging apparatus and a light emitting apparatus using radio waves. In this camera system, the imaging apparatus transmits a command to start a light emission to the light emitting apparatus using radio waves, and the light emitting apparatus receives the command to start a light emission.

However, in the above-described system, it may be difficult to synchronize an operation of the imaging apparatus and a light emission of the wirelessly connected light emitting apparatus depending on a usage environment due to an influence of, for example, an obstacle or an interference by another radio wave.

Therefore, Japanese Patent Application Laid-Open No. 2008-102337 discusses a method for inserting timing data in a packet to be transmitted from a master unit in a wireless light supplementation system, and changing a state of packet transmission at timing of start of the processing related to photography, thereby instructing a remote flash unit to start a light emission.

In the above-described system, a delay time appears, which includes, for example, a period of modulation and demodulation between digital signals and radio waves. However, the method discussed in Japanese Patent Application Laid-Open No. 2008-102337 is not configured in consideration of, for example, a modulation period at the radio wave transmission side, a demodulation period at the radio wave reception side, and a period of radio wave transfer from the transmission side to the reception side. Therefore, it is impossible to accurately synchronize an operation of the camera and a light emission of the remote flash unit.

SUMMARY OF THE INVENTION

According to an aspect of the present invention, an imaging apparatus, which can communicate with a light emitting apparatus via a radio wave communication unit using a radio wave, includes a light emission start instruction unit configured to output a light emission start instruction addressed to the light emitting apparatus, to the radio wave communication unit, an acquisition unit configured to acquire a first light emission delay time that the light emitting apparatus requires for the processing from completion of reception of data indicating the light emission start instruction issued from the radio wave communication unit to start of light emission, and a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit to completion of transmission of the data indicating the light emission start instruction issued from the radio wave communication unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating a main operation of a camera main body.

FIG. 5 is a flowchart illustrating the main operation of the camera main body.

FIGS. 6A-6F illustrates light emission timing in a normal light emission mode.

FIGS. 7A-7E illustrates communication timing in the wireless communication using radio waves.

FIGS. 8A-8H illustrates light emission timing in the wireless communication using radio waves.

FIGS. 9A-9H illustrates light emission timing in optical wireless communication.

DESCRIPTION OF THE EMBODIMENTS

Various exemplary embodiments, features, and aspects of the invention will be described in detail below with reference to the drawings.

Figure 1:
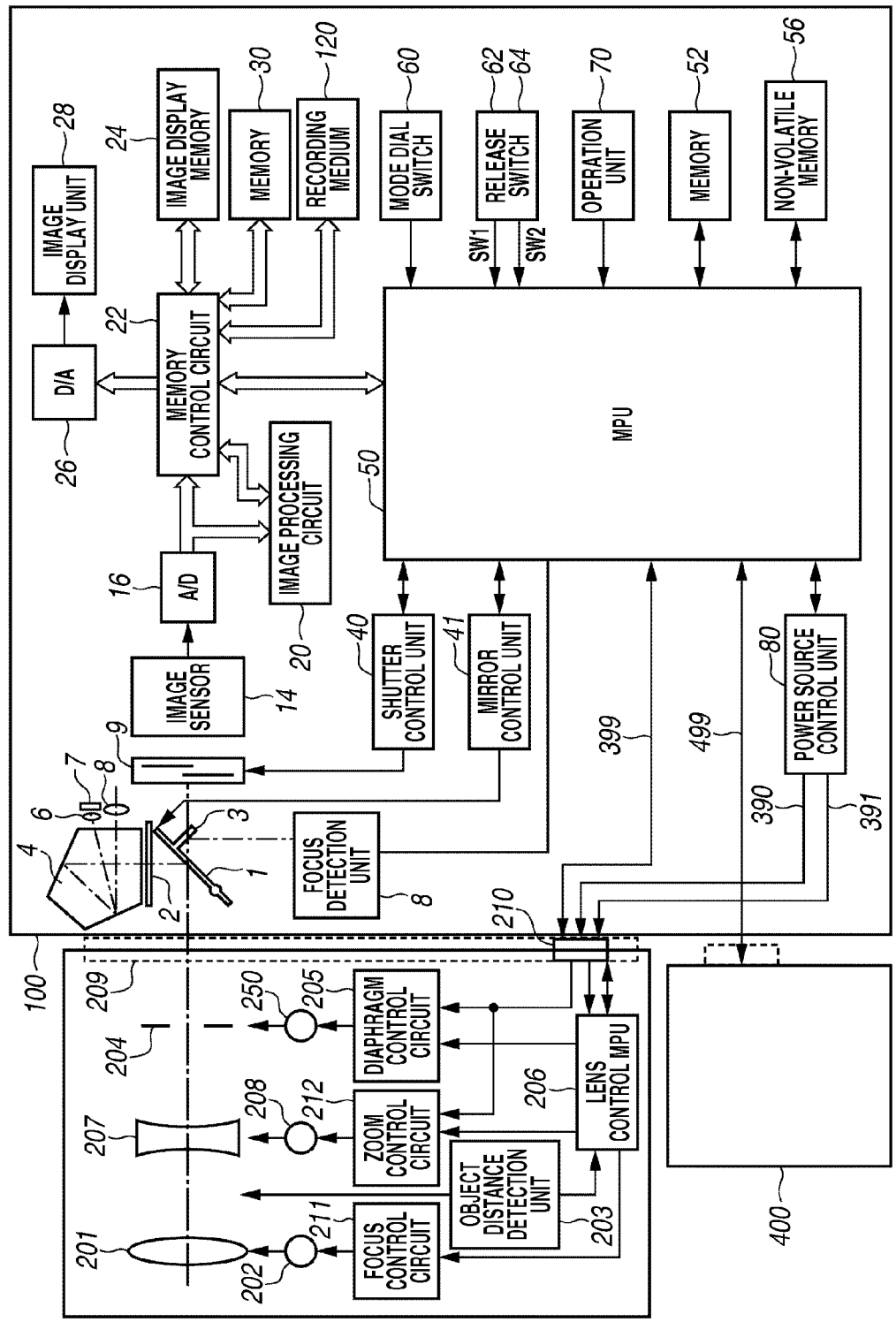
FIG. 1 is a block diagram illustrating a configuration of a camera as an imaging apparatus according to an exemplary embodiment of the present invention.

FIG. 1 is a block diagram illustrating a configuration of a camera as an imaging apparatus according to an exemplary embodiment of the present invention. A camera main body 100 will be described with reference to FIG. 1.

A main mirror 1 is obliquely disposed in an imaging optical path when the camera is in a finder observation state, and is retracted to the outside of the imaging optical path when the camera is in an image capturing state. The main mirror 1 is a half mirror, and allows transmission of approximately a half of a light beam from an object when the main mirror 1 is obliquely disposed in the imaging optical path. An object image formed by an interchangeable lens 200, which will be described below, is projected on a focus plate 2.

A sub mirror 3, together with the main mirror 1, is obliquely disposed in the imaging optical path when the camera is in the finder observation state, and is retracted to the outside of the imaging optical path when the camera is in the image capturing state. This sub mirror 3 bends the light beam transmitted through the obliquely disposed main mirror 1 downward to guide the light beam toward a focus detection unit 8, which will be described below.

A pentagonal prism 4 is a prism for changing a finder optical path. A finder 5 is prepared for observation of an imaging screen, and a photographer can observe an imaging screen by observing the focus plate 2 from this finder 5. An imaging lens 6 and a light metering sensor 7 are used to measure luminance of an object within an imaging screen.

The focus detection unit 8 is used in focus detection according to the known phase difference system. A focal-plane shutter 9 is used to adjust an exposure time of an image sensor 14. The image sensor 14 is a sensor such as a charge coupled device (CCD) or a complementary metal-oxide semiconductor (CMOS).

An analog/digital (A/D) convertor 16 converts an analog signal output from the image sensor 14 to a digital signal. An image processing circuit 20 performs, for example, predetermined pixel interpolation processing on data from the A/D convertor 16 or data from a memory control circuit 22. The memory control circuit 22 controls the A/D convertor 16, the image processing circuit 20, an image display memory 24, a digital/analog (D/A) convertor 26, and a memory 30.

Display image data written in the image display memory 24 is displayed by an image display unit 28 disposed on a back surface of the camera main body 100 via the D/A convertor 26. Further, the image display unit 28 also works as a display interface for a camera operation, and displays various operation statuses of the camera.

The memory 30 is a memory for storing a captured still image and a captured moving image, and has a storage capacity enough to store still images of a predetermined number and a moving image corresponding to a predetermined time. Further, the memory 30 is also used as a work area of a camera micro processing unit (MPU) 50.

A shutter control unit 40 controls the focal-plane shutter 9. A mirror control unit 41 includes a motor and a drive circuit for moving up or down the main mirror 1.

The camera MPU 50 controls the entire camera main body 100. A memory 52 stores, for example, constants, variables, and programs for an operation of the camera MPU 50. A non-volatile memory 56 is an electrically erasable and recordable memory, and is embodied by, for example, an electrically erasable programmable read-only memory (EEPROM).

A mode dial switch 60 is used to switch a setting of an image capturing mode (a manual mode, an aperture priority automatic exposure (AE) mode, a shutter priority AE mode, and a programmed AE mode). A release switch SW1 (62) is turned on at a first stage in an operation of a shutter button included in an operation unit 70, and instructs the camera to start an image capturing preparation such as automatic focusing (AF) processing and automatic exposure (AE) processing.

A release switch SW2 (64) is turned on at a second stage in the operation of the shutter button, and instructs the camera to start an image capturing operation such as exposure processing for writing a signal read from the image sensor 14 into the memory 30 as image data via the A/D convertor 16 and the memory control circuit 22.

The operation unit 70 includes, for example, various kinds of buttons such as a release button and a touch panel. A power source control unit 80 supplies a voltage required for various kinds of control circuits using a direct current (DC)-DC convertor. A recording medium 120 is a medium such as a memory card or a hard disk.

A communication line 399 is a line enabling communication between the interchangeable lens 200 and the camera MPU 50, which will be described below. A communication line 499 is a line enabling communication between a flash apparatus 400 and the camera MPU 50, which will be described below.

Next, the interchangeable lens 200 will be described. A focusing lens 201 is a lens for adjusting a focus state of an object image formed in the image sensor 14. A focus driving actuator 202 drives the focusing lens 201 in an optical axial direction. A focus control circuit 211 controls the focus driving actuator 202 based on an instruction from a lens MPU 206.

An object distance detection unit 203 includes an encoder for detecting a distance from the position of the focusing lens 201 to an object. A diaphragm 204 is a beam attenuation member for adjusting a light amount incident on the camera main body 100. A diaphragm driving actuator 250 drives the diaphragm 204. A diaphragm control circuit 205 controls the diaphragm driving actuator 250 based on an instruction from the lens MPU 206.

A zooming lens 207 is a lens for adjusting a focal length. A zoom driving actuator 208 drives the zooming lens 207 in the optical axial direction. A zoom control circuit 212 controls the zoom driving actuator 208.

The lens MPU 206 controls the above-described driving of the focusing lens 201 and the diaphragm 204, and the communication with the camera MPU 50.

Further, the interchangeable lens 200 is detachably attached to the camera main body 100 via a lens mount 209. Further, the interchangeable lens 200 is electrically connected to the camera main body 100 via a connector 210 including a serial communication line and a power source.

The flash apparatus 400 is a light emitting apparatus detachably mounted on the camera main body 100, and performs wireless communication with a slave flash apparatus disposed at a position away from the camera main body 100 using radio waves or light.

Figure 2:
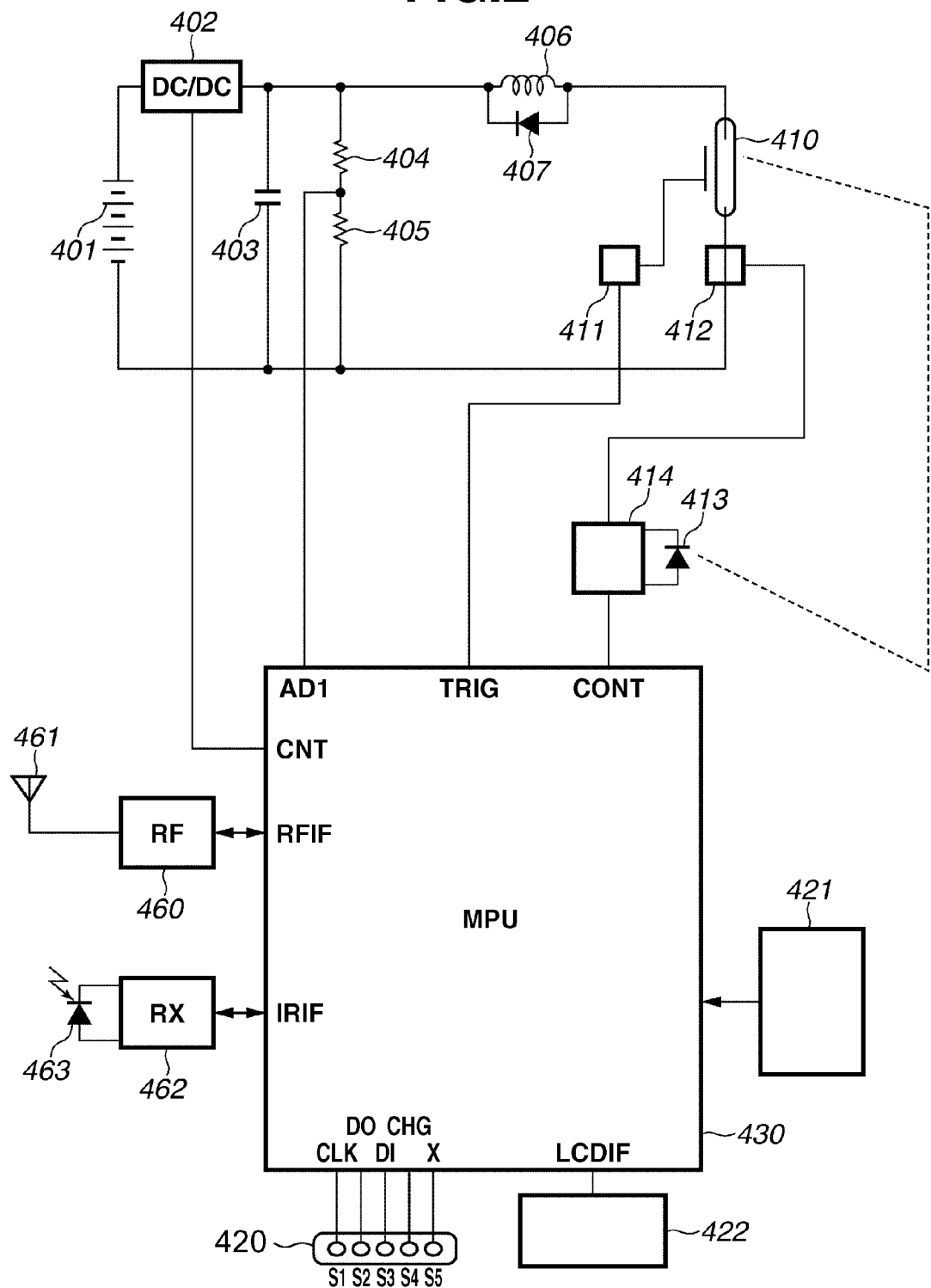
FIG. 2 is a block diagram illustrating an electric configuration of a flash apparatus as a light emitting apparatus according to the exemplary embodiment of the present invention.

Next, a circuit configuration of the flash apparatus 400 will be described with reference to FIG. 2. The flash apparatus 400 is electrically connected to the camera main body 100 via a contact group 420. A voltage of a power source battery 401 is increased to a several hundred V by a DC-DC convertor 402. A main capacitor 403 accumulates energy for a light emission. Resistances 404 and 405 divide a voltage of the main capacitor 403 at a predetermined ratio.

A coil 406 is a coil for limiting an electric current for a light emission. A diode 407 is a diode for absorbing a reverse voltage generated when a light emission is stopped. A light emitting unit 410 is a light emitting unit using a xenon (Xe) tube as a light source. A trigger generation circuit 411 outputs a trigger signal for causing the light emitting unit 410 to emit light. A light emission control circuit 412, such as an insulated gate bipolar transistor (IGBT), controls a light emission of the light emitting unit 410.

A photodiode 413 is a light receiving sensor for controlling a light emission, and monitors a light output of the light emitting unit 410. A light amount control circuit 414 amplifies a photocurrent of the photodiode 413, and controls conduction of the light emission control circuit 412 when the light amount received by the photodiode 413 reaches a predetermined light amount, thereby adjusting a light emission amount of the light emitting unit 410.

An operation switch 421 is used to set, for example, an operation mode of the flash apparatus 400 (a normal mode, a master mode, and a slave mode), and a communication mode used in communication with another flash apparatus (a radio wave communication mode, an optical communication mode, and a non-communication mode). When the communication mode is the radio wave communication mode, the flash apparatus 400 can bidirectionally communicate with another flash apparatus. When the communication mode is the optical communication mode, the flash apparatus 400 can unidirectionally communicate with another flash apparatus, allowing only communication from the master flash apparatus to the slave flash apparatus. A display unit 422 displays, for example, the operation mode of the flash apparatus 400. A flash apparatus MPU 430 controls various units of the flash apparatus 400, and communication between the flash apparatus 400 and the camera MPU 50.

A radio frequency (RF) module 460 for wireless communication includes an RF chip that processes a wireless protocol such as ZigBee (registered trademark) or BlueTooth (registered trademark), according to which data is received and transmitted in the 2.4 GHz band (the Industrial, Medical, and Scientific (IMS) band). An antenna 461 is configured to transmit and receive radio waves, and functions as a radio wave communication unit together with the RF module 460.

A light receiving circuit 462 is an interface circuit used in optical communication when the master flash apparatus and the slave flash apparatus communicate with each other via optical communication. This light receiving circuit 462 functions as an optical communication unit, together with a photodiode 463 and the light emitting unit 410.

Figure 3:
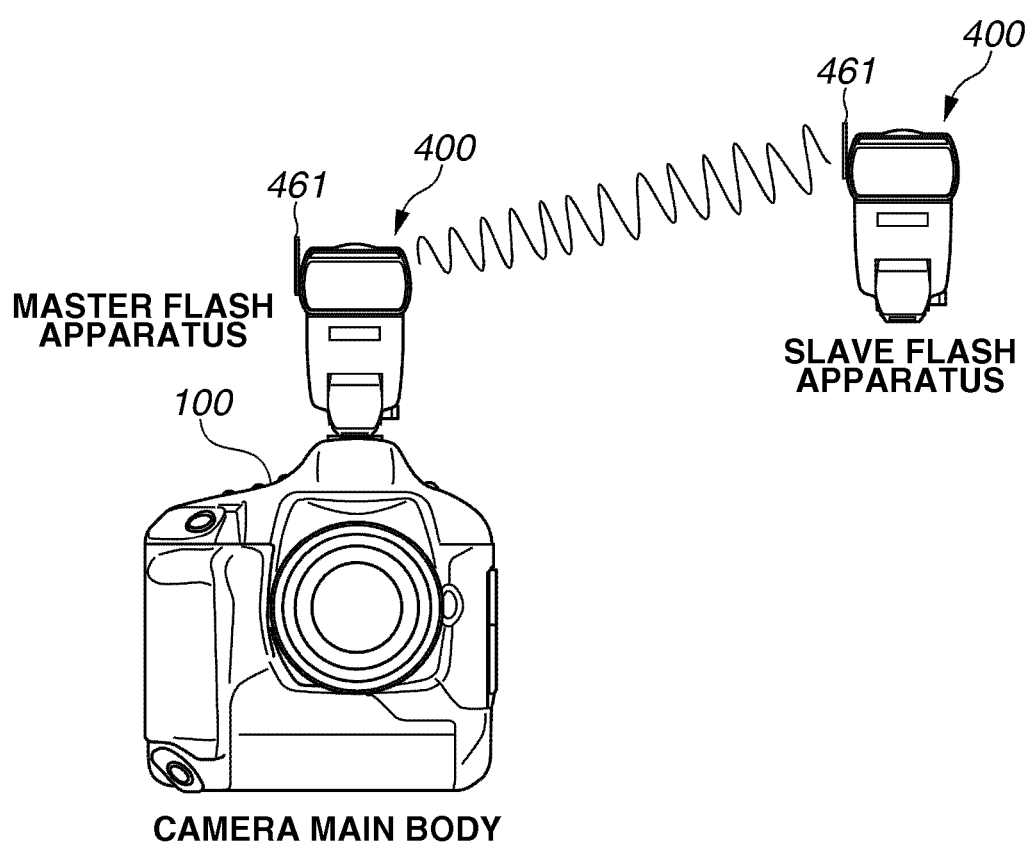
FIG. 3 illustrates a camera system in which the imaging apparatus and the light emitting apparatus perform wireless communication using radio waves according to the exemplary embodiment of the present invention.

FIG. 3 illustrates a camera system in which the imaging apparatus and the light emitting apparatus perform wireless communication using radio waves according to the present exemplary embodiment. The same members as the members illustrated in FIGS. 1 and 2 are indicated by the same reference numerals as the reference numerals used in FIGS. 1 and 2.

The flash apparatus 400 set to the master mode is mounted on the camera main body 100. In this camera system, the flash apparatus 400 set to the master mode is used as the master flash apparatus. On the other hand, the flash apparatus 400 configured similar to the master flash apparatus and set to the slave mode is used as the slave flash apparatus, and is disposed at a position away from the camera main body 100. FIG. 3 illustrates only one flash apparatus 400 as the slave flash apparatus, but a plurality of slave flash apparatuses may be disposed in the camera system.

Next, an operation flow of the camera main body 100 according to the present exemplary embodiment will be described with reference to FIGS. 4 and 5. In step S101, the camera MPU 50 initializes, for example, flags and control variables, when the camera is turned on by a not-illustrated power source switch. Subsequently, in step S102, the camera MPU 50 checks the state of the release switch SW1. If the release switch SW1 is turned on (YES in step S102), the processing proceeds to step S103.

In step S103, the camera main body 100 measures luminance of an object, calculates a diaphragm value and a shutter speed for image capturing by a known method, and detects a defocus state (a defocus amount) of the object. The detected defocus state is transmitted from the camera MPU 50 to the lens MPU 206. The lens MPU 206 drives the focusing lens 210 via the focus control circuit 211 and brings the object into focus.

Subsequently, in step S104, the camera MPU 50 identifies the communication mode of the master flash apparatus set to the master mode, which is mounted on the camera main body 100. If the master flash apparatus is set not to communicate with another flash apparatus (NON-COMMUNICATION in step S104), the master flash apparatus is in a normal light emission mode (a mode in which only the master flash apparatus mounted on the camera main body 100 emits light). Therefore, in step S105, the camera MPU 50 acquires a light emission delay time in the normal light emission mode from the master flash apparatus.

Now, the light emission delay time in the normal light emission mode (in a case where the master flash apparatus is set not to communicate with another flash apparatus) will be described with reference to FIGS. 6A to 6F. FIGS. 6 A, 6B, and 6C indicate serial communication line signals between the master flash apparatus and the camera main body 100. In particular, CLK of FIG. 6A indicates a synchronous clock, DI of FIG. 6B indicates communication data from the camera main body 100 to the main flash apparatus, and DO of FIG. 6C indicates communication data from the master flash apparatus to the camera main body 100. FIG. 6D indicates a waveform of a trigger voltage of several thousand volts, which is generated by the trigger circuit 411 to cause the light emitting unit 410 to emit light. FIG. 6E indicates a waveform of a light emission from the light emitting unit 410 of the master flash apparatus in the normal light emission mode. FIG. 6F indicates an operation of the camera main body 100, and indicates a state where the camera main body 100 causes the master flash apparatus to perform a preliminary light emission to meter light reflected by an object, or a state where the camera main body 100 causes the master flash apparatus to perform a main light emission to capture an image.

Referring to FIGS. 6A to 6F, at time t1, the camera main body 100 transmits light emission control information including a light emission mode such as a preliminary light emission mode, a main light emission mode, a flashlight light emission mode and a Focal Plane (FP) light emission mode, as well as a light emission amount, and a light emission time, to the master flash apparatus via serial communication.

After the serial communication is completed at time t2, the flash apparatus MPU 430 sets the DO line of FIG. 6C to a Low (Lo) level during execution of light emission preparation based on the light emission control information, thereby notifying the camera main body 100 that the light emission preparation is currently in progress.

Then, at time t3, the light emission preparation is completed and the flash apparatus MPU 430 sets the DO line to a High (Hi) level. After that, at time t4, the camera MPU 50 sets the CLK terminal to the Lo level to output a light emission start instruction to the master flash apparatus.

On the other hand, after the flash apparatus MPU 430 detects that the CLK terminal is set to the Lo level, at time t5, the flash apparatus MPU 430 sets the light emission control circuit 412 to ON, activates the trigger circuit 411, and causes the trigger circuit 411 to generate a light emission trigger voltage.

However, even though the trigger voltage is supplied to the xenon tube at time t5, the xenon tube, which is the light emitting unit, does not start a light emission immediately. After approximately 50 microseconds have passed after the generation of the trigger voltage (time t6), a light emission starts.

Therefore, even though the camera main body 100 issues a light emission start instruction at time t4, an actual light emission starts at time t6 since, for example, a processing time by the software in the flash apparatus MPU 430 and a delay in a light emission are added to the processing time. Such a time elapsed from issuance of a light emission start instruction until an actual start of a light emission is referred to as a "light emission delay time". The light emission delay time is approximately 70 microseconds in the normal light emission mode.

The light emission delay time in the normal light emission mode is presumed to be approximately constant for each flash apparatus 400. Therefore, an estimated light emission delay time is stored in the flash apparatus 400 in advance, and in step S105, the flash apparatus MPU 430 notifies the camera main body 100 of the stored light emission delay time so that the camera MPU 50 acquires the light emission delay time. In a case where the light emission delay time varies depending on a usage condition of the flash apparatus 400, the flash apparatus MPU 430 may correct the stored light emission delay time according to a usage condition, and then notify the camera main body 100 of the corrected light emission delay time.

If the camera MPU 50 determines in step S104 that the communication mode is the radio wave communication mode (RADIO WAVE COMMUNICATION in step S104), the camera MPU 50 requests the slave flash apparatus to transmit the light emission delay time via the master flash apparatus using radio wave communication. At this time, the slave flash apparatus transmits the light emission delay time to the master flash apparatus via radio wave communication in response to the transmission request. In step S106, the camera MPU 50 acquires the light emission delay time caused by the slave flash apparatus (a first light emission delay time) in this way.

Now, the communication between the master flash apparatus and the slave flash apparatus using radio waves for acquiring the light emission delay time caused by the slave flash apparatus in step S106 will be described with reference to FIGS. 7A to 7E. FIGS. 7 A, 7B, and 7C correspond to FIGS. 6A, 6B, and 6C, respectively. FIG. 7D schematically illustrates an operation of the RF module 460 of the master flash apparatus, and FIG. 7E schematically illustrates an operation of the RF module 460 of the slave flash apparatus.

Referring to FIGS. 7A to 7E, at time t1, the camera main body 100 inquires about the light emission delay time caused by the slave flash apparatus to the master flash apparatus via serial communication.

After the serial communication is completed at time t2, the flash apparatus MPU 430 of the master flash apparatus sets the DO line of FIG. 7C to the Lo level to indicate that the main flash apparatus is currently communicating with the slave flash apparatus. In this communication processing, as indicated by FIG. 7D, the flash apparatus MPU 430 turns on a not-illustrated RF transmission circuit in the RF module 460, and waits until operations of a not-illustrated crystal oscillator and the RF transmission circuit are stabilized, as a transmission preparation period.

Subsequently, at time t3, the master flash apparatus starts to transmit radio waves requesting transmission of the light emission delay caused by the slave flash apparatus, and transmits a synchronization header of 5 bytes, packet length data of 1 byte, and payload data of n byte(s).

The synchronization header is constituted by 5 bytes in the present exemplary embodiment. The first four bytes are referred to as a "preamble", and data "0" is packed therein. The fifth byte is referred to as a "Start of Frame Delimiter (SFD)", and for example, "A7" is packed therein. The fifth byte indicates the end of the preamble and the start of transmission data. The next packet length data indicates the length of the subsequent payload data. In the payload data, data that should be transmitted actually is packed.

These transmitted radio waves are received by the RF module 460 of the slave flash apparatus approximately at the same time as the time when the radio waves are transmitted. After the transmission operation of the master flash apparatus is completed at time t4, the flash apparatus MPU 430 of the slave flash apparatus analyzes the received payload data, and finds out therefrom that this is a command ordering transmission of the light emission delay time caused by the slave flash apparatus. This command analysis takes a predetermined time, and is indicated as a command analysis period in FIG. 7E.

After the command analysis is completed, at time t5, the flash apparatus MPU 430 of the slave flash apparatus sets the RF module 460 to the transmission mode to transmit data relating to the light emission delay time from the slave flash apparatus to the master flash apparatus. Then, the flash apparatus MPU 430 packs the light emission delay time caused by the slave flash apparatus in the payload data in a manner similar to the above-described transmission from the master flash apparatus, and transmits the generated data.

On the other hand, after completion of the transmission of the data at time t4, the flash apparatus MPU 430 of the master flash apparatus switches the RF module 460 to the reception mode to receive the data relating to the light emission delay time to be transmitted from the slave flash apparatus.

After that, the flash apparatus MPU 430 of the master flash apparatus receives the data relating to the light emission delay time from the slave flash apparatus during the period from time t6 to time t7, and reads out the light emission delay time caused by the slave flash apparatus in the received payload data.

Then, the flash apparatus MPU 430 of the master flash apparatus writes that data into a not-illustrated serial communication buffer, which is output as data of DO of FIG. 7C, and sets the DO line to the Hi level, thereby notifying the camera main body 100 that the communication processing is completed.

After the completion of the communication processing is notified, at time t8, the camera MPU 50 performs serial communication, so that the flash apparatus MPU 430 of the master flash apparatus outputs the data in the above-described serial communication buffer to the DO line. As a result, the camera MPU 50 can acquire the light emission delay time caused by the slave flash apparatus via the master flash apparatus.

Subsequently, in step S107, the camera MPU 50 inquires about the light emission delay time caused by the master flash apparatus (a second light emission delay time) to the master flash apparatus via the above-described serial communication, thereby acquiring in a similar manner the light emission delay time caused by the master flash apparatus in serial communication.

A description will be provided about the light emission delay time including the light emission delay time caused by the master flash apparatus and the light emission delay time caused by the slave flash apparatus in a case where the communication mode is the radio communication mode, with reference to FIGS. 8A to 8H.

FIGS. 8A, 8B, and 8 C correspond to FIGS. 6A, 6B, and 6C and FIGS. 7A, 7B, and 7C, respectively. Further, FIGS. 8D and 8E correspond to FIGS. 7D and 7E, respectively. FIGS. 8F, 8G, and 8H correspond to FIGS. 6D, 6E, and 6F, respectively.

Referring to FIGS. 8A, 8B, and 8C, at time t1, the camera main body 100 notifies the master flash apparatus of light emission control information addressed to the slave flash apparatus, including a light emission mode such as the preliminary light emission mode, the main light emission mode, the flashlight light emission mode or the FP light emission mode, as well as light emission amount and a light emission time, via serial communication.

After the serial communication is completed at time t2, the flash apparatus MPU 430 of the master flash apparatus sets the DO line of FIG. 8C to the Lo level during execution of transmission processing based on the light emission control information, thereby notifying the camera main body 100 that the transmission processing is currently in progress.

At the same time, the flash apparatus MPU 430 packs data relating to the light emission control information addressed to the slave flash apparatus in the payload data in a manner similar to the transmission operation by the master flash apparatus illustrated in FIGS. 7A to 7E, and the master flash apparatus transmits radio waves to the slave flash apparatus.

The slave flash apparatus receives the data relating to the light emission control information from the master flash apparatus via the RF module 460 approximately at the same time as the time when the data is transmitted. Then, the flash apparatus MPU 430 of the slave flash apparatus analyzes the command.

Subsequently, at time t5, the camera MPU 50 sets the CLK terminal to the Lo level, and outputs a light emission start instruction addressed to the slave flash apparatus, to the master flash apparatus. At this time, if the flash apparatus MPU 430 of the master flash apparatus detects that the CLK terminal is set to the Lo level at time t5, the master flash apparatus transmits radio waves of data indicating the light emission start instruction, in which a command instructing the slave flash apparatus to start a light emission is packed in the payload data, to the slave flash apparatus.

The slave flash apparatus receives the data indicating the light emission start instruction via the RF module 460. At time t6, the slave flash apparatus sets the light emission control circuit 412 to an ON state. At time t7, the slave flash apparatus activates the trigger circuit 411, and causes the trigger circuit 411 to generate a light emission trigger voltage. Then, after approximately 50 microseconds have passed from the generation of the trigger voltage (time t8), the light emitting unit 410 of the slave flash apparatus starts a light emission.

Therefore, even though the camera main body 100 issues a light emission start instruction at time t5, actual light transmission starts at time t8 since, for example, the transmission preparation period of the master flash apparatus, the radio wave transmission time, a processing time by the software in the flash apparatus MPU 430 of the slave flash apparatus, and a delay in a light emission are added to the processing time.

The period from time t5 to time t6, i.e., the time from the output of the light emission start instruction issued from the camera MPU 50 to the completion of the transmission of the data indicating the light emission start instruction issued from the master flash apparatus corresponds to the light emission delay time caused by the master flash apparatus. On the other hand, the period from time t6 to time t8, i.e., the time from the completion of the reception of the data indicating the light emission start instruction transmitted from the master flash apparatus by the slave flash apparatus, to the start of the light emission corresponds to the light emission delay time caused by the slave flash apparatus.

The light emission delay time caused by the master flash apparatus from time t5 to time t6 varies depending on the number of communicated bytes and the speed in radio wave communication. For example, in a case where a communication speed is 250 kbps (250000 bits per second), a time required to transmit radio waves is 4 microseconds×8 bits=32 microseconds per byte. Therefore, in a case where the data contains the synchronization header of 5 bytes, packet length data of 1 byte, and payload data of 2 bytes as is the case with the present exemplary embodiment, the data transmission takes 32 microseconds×8 bytes=256 microseconds in total.

Therefore, the light emission delay time caused by the master flash apparatus is determined based on the above-described transmission preparation period, and the communication speed and the number of communicated bytes in radio wave transmission. Specifically, the light emission delay time caused by the master flash apparatus in a case where the communication speed is 250 kbps is 376 microseconds in total, since the transmission preparation time is 120 microseconds, and the radio wave transmission time is 256 microseconds.

Further, in a case where the communication speed is 1 Mbps (1000000 bits per second), a time required to transmit radio waves is 1 microsecond×8 bits=8 microseconds per byte. Therefore, in a case where the data contains the synchronization header of 5 bytes, the packet length data of 1 byte, and the payload data of 2 bytes as is the case with the present exemplary embodiment, the data transmission takes 8 microseconds×8 bytes=64 microseconds in total. Therefore, the light emission delay time caused by the master flash apparatus in a case where the communication speed is 1 Mbps is calculated as 184 microseconds in total by adding 120 microseconds of the transmission preparation time to 64 microseconds of the radio wave transmission time.

In this way, the light emission delay time caused by the master flash apparatus varies depending on the communication speed and the number of communicated bytes, and can be calculated in advance by the flash apparatus MPU 430 of the master flash apparatus based on the communication speed and the number of communicated bytes.

In step S107, the flash apparatus MPU 430 of the master flash apparatus notifies the camera MPU 50 of the calculated light emission delay time via serial communication in response to the inquiry from the camera MPU 50, enabling the camera MPU 50 to acquire the light emission delay time caused by the master flash apparatus. Alternatively, in step S107, the camera MPU 50 may acquire the communication speed and the number of communicated bytes at the time of transmission of data indicating a light emission start instruction from the master flash apparatus, and calculate the light emission delay time caused by the master flash apparatus based on the acquired communication speed and number of communicated bytes.

On the other hand, the light emission delay time caused by the slave flash apparatus is determined based on the time required to analyze a light emission start instruction command transmitted from the master flash apparatus, and the time from generation of a trigger voltage until a start of a light emission. More specifically, in the present exemplary embodiment, it takes 10 microseconds (t6 to t7 illustrated in FIGS. 8A to 8H) to analyze the command, and it takes 50 microseconds (t7 to t8 illustrated in FIGS. 8A to 8H) from generation of a trigger voltage to a start of a light emission. Therefore, it takes 60 microseconds in total as the light emission delay time caused by the slave flash apparatus.

The light emission delay time caused by the slave flash apparatus is presumed to be approximately constant for each flash apparatus 400. Therefore, an estimated light emission delay time is stored in the flash apparatus 400 in advance. In step S106, the camera MPU 50 acquires the light emission delay time stored in the flash apparatus MPU 430 of the salve flash apparatus via the master flash apparatus. Further, in a case where the light emission delay time varies depending on a usage condition of the flash apparatus 400, the flash apparatus MPU 430 of the slave flash apparatus may correct the stored light emission delay time depending on a usage condition, and then notify the master flash apparatus of the corrected light emission delay time.

If the camera MPU 50 determines in step S104 that the communication mode is the optical communication mode (OPTICAL COMMUNICATION in step S104), the processing proceeds to step S108, in which the camera MPU 50 acquires the light emission delay time caused by the master flash apparatus when the master flash apparatus performs optical communication, via serial communication.

The light emission delay time when the communication mode is the optical communication mode will be described with reference to FIGS. 9A to 9H. FIGS. 9A, 9B, and 9C correspond to A, B, and C illustrated in FIGS. 6 to 8, respectively. Further, FIG. 9D indicates a waveform of a light emission from the light emitting unit 410 of the master flash apparatus, and the master flash apparatus transmits data using a combination of small optical pulses.

Optical pulses corresponding to the first two bits in the first byte are channel identification signals, and a subsequent optical pulses of 8 bits is emitted at predetermined intervals only when the data is 1. The second byte and thereafter are constituted by the first bit as a start pulse, and subsequent optical pulses of 8 bits. In the present exemplary embodiment, the transmission data has two bytes, and a light emission start pulse (3) at time t5 serves as a light emission start instruction signal to the slave flash apparatus.

Further, FIG. 9E indicates timing when the slave flash apparatus receives an optical signal from the master flash apparatus, analyzes the command, and emits light. When the slave flash apparatus receives a predetermined number of optical pulses transmitted as the above-described optical signal from the master flash apparatus during a data reception period (1), the slave flash apparatus analyzes the received data during a first byte command analysis period (2). Then, the slave flash apparatus receives data of the second byte during a subsequent data reception period (3), and analyzes the command during a second byte command analysis period (4). When the slave flash apparatus receives a light emission start pulse (3), the slave flash apparatus prepares for a light emission and then emits light during a light emission processing period (5). Further, FIGS. 9G and 9H correspond to FIGS. 8G and 8H, respectively.

Referring to FIGS. 9A to 9H, at time t1, the camera main body 100 notifies the master flash apparatus of light emission control information addressed to the slave flash apparatus, including a light emission mode such as the preliminary light emission mode, the main light emission mode the flashlight light emission mode or the Focal Plane (FP) light emission mode, as well as a light emission amount and a light emission time, via serial communication.

After the serial communication is completed at time t2, the flash apparatus MPU 430 of the master flash apparatus sets the DO line of FIG. 9C to the Lo level during execution of transmission processing based on the light emission control information, thereby notifying the camera main body 100 that the transmission processing is currently in progress.

At the same time, the master flash apparatus transmits a light emission command relating to the light emission control information notified from the camera main body 100 as 2-byte data to the slave flash apparatus by causing the light emitting unit 410 of the master flash apparatus to emit light as a pulse. The slave flash apparatus receives the data relating to the light emission control information from the master flash apparatus via the light receiving unit approximately at the same time as the time when the data is transmitted, and then analyzes the command.

Subsequently, at time t4, the camera MPU 50 sets the CLK terminal to the Lo level, thereby issuing a light emission start instruction to the slave flash apparatus. Then, when the CLK terminal is set to the Lo level, the flash apparatus MPU 430 of the master flash apparatus transmits the light emission start instruction issued from the camera main body 100 to the slave flash apparatus as an optical pulse.

The delay time from time t4, when the light emission start instruction is issued, to time t5, when the light emission start instruction is transmitted as an optical pulse, corresponds to the light emission delay time caused by the master flash apparatus. This light emission delay time caused by the master flash apparatus includes the delay time from reception of the light emission start instruction addressed to the slave flash apparatus issued from the camera main body 100 to generation of a trigger voltage, and the delay time from the generation of the trigger voltage to an actual start of a light emission.

The slave flash apparatus receives the optical pulse relating to the light emission start instruction via the light receiving unit. At time t5, the slave flash apparatus sets the light emission control circuit 412 to an ON state, activates the trigger circuit 411, and causes the trigger circuit 411 to generate a light emission trigger voltage at time t6. Then, the slave flash apparatus starts a light emission after approximately 50 microseconds have passed (time t7) from the generation of the trigger voltage.

Therefore, even though the camera main body 100 issues a light emission start instruction at time t4, actual light emission starts at time t7 since the light emission delay time caused by the master flash apparatus and the light emission delay time caused by the slave flash apparatus are added to the processing time.

In the present exemplary embodiment, optical communication is unidirectional communication from the master flash apparatus to the slave flash apparatus. Therefore, the camera MPU 50 cannot acquire the light emission delay time caused by the slave flash apparatus from the slave flash apparatus in a manner similar to radio wave communication.

However, the light emission delay time caused by the slave flash apparatus is only the delay time from reception of an optical pulse relating to a light emission start instruction to an actual light emission, and is considered to be approximately equal to the light emission delay time caused by the master flash apparatus. Therefore, in the present exemplary embodiment, the light emission delay time when optical communication is performed is calculated by doubling the light emission delay time caused by the master flash apparatus.

Next, referring back to FIG. 4, in step S109, which is a subsequent step, the camera MPU 50 checks the state of the release switch SW2. If the release switch SW2 is turned off (NO in step S109), the processing proceeds to step S102 again. If the release switch SW2 is turned on (YES in step S109), the processing proceeds to step S110. In step S110, the camera MPU 50 checks whether the main capacitor 403 of the master flash apparatus is charged to have a predetermined voltage, and the master flash apparatus is ready for a light emission. When the main capacitor 403 is charged to have the predetermined voltage, the flash apparatus MPU 430 of the master flash apparatus notifies the camera main body 100 that the main capacitor 403 is charged to have the predetermined voltage via the above-described serial communication.

If the master flash apparatus is ready for a light emission (YES in step S110), the processing proceeds to step S111. If the master flash apparatus is not ready for a light emission (NO in step S110), the processing proceeds to step S130. In step S130, the camera captures an image without a light emission from the flash apparatus 400 (CAPTURE IMAGE WITHOUT LIGHT EMISSION) since a desired light amount cannot be acquired even if the master flash apparatus emits light. In a case where the camera is set not to use a light emission from the master flash apparatus, step S110 may be omitted.

Subsequently, in step S111, the camera MPU 50 identifies the communication mode of the master flash apparatus. If radio wave communication is set as the communication mode (RADIO WAVE COMMUNICATION in step S111), the processing proceeds to step S112. If another mode is set as the communication mode (ANOTHER COMMUNICATION THAN RADIO WAVE COMMUNICATION in step S111), the processing proceeds to step S120. The processing proceeds to step S112 if radio wave communication is set as the communication mode, because the camera MPU 50 can recognize a charged voltage of the main capacitor 403 of the slave flash apparatus via bilateral communication. On the other hand, the processing proceeds to step S120 if the main flash apparatus is set not to communicate with another flash apparatus, because the camera MPU 50 does not have to recognize a charged voltage of the slave flash apparatus since the camera does not use the slave flash apparatus. Further, the processing proceeds to step S120 if optical communication is set as the communication mode, because optical communication is unilateral communication from the master flash apparatus to the slave flash apparatus, so that the camera MPU 50 cannot recognize a charged voltage of the slave flash apparatus.

In step S112, the camera MPU 50 checks whether the main capacitor 403 of the slave flash apparatus is charged to have a predetermined voltage, and the slave flash apparatus is ready for a light emission. When the main capacitor 403 is charged to have the predetermined voltage, the flash apparatus MPU 430 of the slave flash apparatus notifies the master flash apparatus that charging is completed to have the predetermined voltage via the above-described radio wave communication. Then, the master flash apparatus notifies the camera main body 100 that the slave flash apparatus is charged to have the predetermined voltage via serial communication. If the slave flash apparatus is ready for a light emission (YES in step S112), the processing proceeds to step S120. If the slave flash apparatus is not ready for a light emission (NO in step S112), the proceeding proceeds to step S130 since a desired light amount cannot be acquired even if the slave flash apparatus emits light.

In step S120, the master flash apparatus and/or the slave flash apparatus performs a preliminary light emission prior to a main light emission. In a case where the communication mode is set to the mode of non-communication with another flash apparatus, only the master flash apparatus performs a preliminary light emission. In other communication modes, one or both of the master flash apparatus and the slave flash apparatus perform a preliminary light emission. In a case where both the master flash apparatus and the slave flash apparatus perform a preliminary light emission, the master flash apparatus and the slave flash apparatus each perform a preliminary light emission at different timing, and the camera MPU 50 uses a light metering result at each of these times to calculate each main light emission amount according to main light emission amount calculation, which will be described below.

Further, at the time of execution of a preliminary light emission, as described with reference to FIGS. 6A to 6F, 8A to 8H, and 9A to 9H, the camera MPU 50 controls timing when the light metering sensor 7 starts light metering during the preliminary light emission, so as to be synchronized with the preliminary light emission based on the light emission delay time according to the communication mode. More specifically, the camera MPU 50 controls the light metering sensor 7 to start light metering when a predetermined time set based on the light emission delay time has passed after the camera MPU 50 issues a light emission start instruction, thereby enabling synchronized execution of the light metering and the preliminary light emission.

Subsequently, in step S121, the camera MPU 50 calculates a main light emission amount according to a known calculation method with use of the light metering result at the time of the preliminary light emission acquired in step S120. In step S122, a main light emission is performed according to the main light emission amount calculated in step S121. At this time, the slave flash apparatus acquires the main light emission amount calculated in step S121 according to the light emission control information transmitted from the camera main body 100 via radio wave communication or optical communication, and controls the light emission so as to achieve the acquired main light emission amount.

Further, in step S122, the camera MPU 50 controls the timing of starting image capturing so as to be synchronized with the main light emission based on the light emission delay time according to the communication mode in a manner similar to step S120. More specifically, the camera MPU 50 controls the camera to start image capturing when a predetermined time set based on the light emission delay time has passed after the camera MPU 50 issues a light emission start instruction, thereby enabling synchronized execution of the image capturing and the main light emission.

Subsequently, in step S123, the camera main body 100 reads out the captured image. In step S124, the camera main body 100 performs digital development by a known method (compresses and converts a sensor output into a format such as Joint Photographic Experts Group (JPEG)). In step S125, the camera main body 100 writes and stores the developed captured image in the external memory 56.

Subsequently, in step S126, the camera MPU 50 checks the state of the release switch SW2. If the release switch SW2 is turned on (YES in step S126), the processing proceeds to step S110 again to continuously capture an image. On the other hand, if the release switch SW2 is turned off (NO in step S126), the processing proceeds to step S102 again to set the camera to an image capturing standby state.

In this way, even when wireless communication is performed with the slave flash apparatus using radio waves, it is possible to synchronize a light emission from the slave flash apparatus and an operation of the camera corresponding to the light emission by acquiring the light emission delay time caused by the master flash apparatus and the light emission delay time caused by the slave flash apparatus, respectively.

Further, when wireless communication is performed using radio waves, it is possible to more accurately synchronize a light emission from the slave flash apparatus and an operation of the camera corresponding to the light emission by calculating the light emission delay time based on the communication speed and the number of communicated bytes in radio wave transmission.

Further, the camera MPU 50 starts an operation of the camera at different timing depending on whether a light emission start instruction is issued via radio wave communication or via optical communication. Accordingly, it is possible to synchronize a light emission from the slave flash apparatus and an operation of the camera corresponding to the light emission in either communication mode.

Further, even if the master flash apparatus can perform only wireless communication using radio waves, it is possible to synchronize a light emission from the slave flash apparatus and an operation of the camera corresponding to the light emission by acquiring the light emission delay time in wireless communication using radio waves as described above.

In the present exemplary embodiment, the camera is configured to perform wireless communication with the slave flash apparatus using radio waves via the flash apparatus 400 mounted on the camera main body 100. However, the camera may be configured to include a radio wave communication unit and directly communicate with the slave flash apparatus. Alternatively, the camera may be configured in such a manner that a radio wave communication apparatus is mounted on the camera main body 100.

Further, in the present exemplary embodiment, the camera is configured to perform optical wireless communication via the flash apparatus 400 mounted on the camera main body 100. However, the camera may be configured to communicate with the slave flash apparatus via a flash apparatus built in the camera main body 100. Alternatively, the camera may be configured to communicate with the slave flash apparatus via a light emission unit other than a flash apparatus that is built in the camera main body 100.

Further, in the present exemplary embodiment, the flash apparatus 400 performs optical communication by emitting light from the xenon tube. However, the flash apparatus 400 may perform optical communication by emitting light from another light source such as a light-emitting diode (LED).

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-262272 filed Nov. 30, 2011, which is hereby incorporated by reference herein in its entirety.

What is claimed is:

1. An imaging apparatus capable of communicating with a light emitting apparatus via a radio wave communication unit using a radio wave, the imaging apparatus comprising:
a light emission start instruction unit configured to output a light emission start instruction addressed to the light emitting apparatus, to the radio wave communication unit;
an acquisition unit configured to acquire a first light emission delay time that the light emitting apparatus requires for a processing from completion of reception of data indicating the light emission start instruction issued from the radio wave communication unit to start of light emission; and
a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit, to completion of transmission of the data indicating the light emission start instruction issued from the radio wave communication unit,
wherein the second light emission delay time finishes before the first light emission delay time appears.

2. The imaging apparatus according to claim 1, wherein the acquisition unit acquires the first light emission delay time from the light emitting apparatus via the radio wave communication unit.

3. An imaging apparatus capable of communicating with a light emitting apparatus via a radio wave communication unit using a radio wave, the imaging apparatus comprising:
a light emission start instruction unit configured to output a light emission start instruction addressed to the light emitting apparatus, to the radio wave communication unit;
an acquisition unit configured to acquire a first light emission delay time that the light emitting apparatus requires for a processing from completion of reception of data indicating the light emission start instruction issued from the radio wave communication unit to start of light emission;
a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit, to completion of transmission of the data indicating the light emission start instruction issued from the radio wave communication unit; and
a calculation unit configured to calculate the second light emission delay time based on a communication speed and a number of communicated bytes when the radio wave communication unit transmits the data indicating the light emission start instruction.

4. An imaging apparatus capable of communicating with a light emitting apparatus via a radio wave communication unit using a radio wave, the imaging apparatus comprising:
a light emission start instruction unit configured to output a light emission start instruction addressed to the light emitting apparatus, to the radio wave communication unit;
an acquisition unit configured to acquire a first light emission delay time that the light emitting apparatus requires for a processing from completion of reception of data indicating the light emission start instruction issued from the radio wave communication unit to start of light emission; and
a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit, to completion of transmission of the data indicating the light emission start instruction issued from the radio wave communication unit,
wherein the acquisition unit acquires the second light emission delay time from the radio wave communication unit.

5. An imaging apparatus capable of communicating with a light emitting apparatus via a radio wave communication unit using a radio wave, the imaging apparatus comprising:
a light emission start instruction unit configured to output a light emission start instruction addressed to the light emitting apparatus, to the radio wave communication unit;
an acquisition unit configured to acquire a first light emission delay time that the light emitting apparatus requires for a processing from completion of reception of data indicating the light emission start instruction issued from the radio wave communication unit to start of light emission; and a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit, to completion of transmission of the data indicating the light emission start instruction issued from the radio wave communication unit, wherein the second light emission delay time finishes before the first light emission delay time appears, wherein the imaging apparatus is an apparatus capable of performing optical communication with the light emitting apparatus via an optical communication unit using light, and wherein the control unit controls the timing at which the imaging apparatus starts an operation corresponding to the light emission performed according to the light emission start instruction at different timing depending on whether the light emission start instruction is issued to the light emitting apparatus via the radio wave communication unit or via the optical communication unit.

6. The imaging apparatus according to claim 1, wherein, in a case where the light emission performed according to the light emission start instruction is a main light emission, the control unit controls timing at which the imaging apparatus starts image capturing so as to be synchronized with the main light emission.

7. An imaging apparatus capable of communicating with a light emitting apparatus via a radio wave communication unit using a radio wave, the imaging apparatus comprising:

a light emission start instruction unit configured to output a light emission start instruction addressed to the light emitting apparatus, to the radio wave communication unit;

an acquisition unit configured to acquire a first light emission delay time that the light emitting apparatus requires for a processing from completion of reception of data indicating the light emission start instruction issued from the radio wave communication unit to start of light emission; and a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit, to completion of transmission of the data indicating the light emission start instruction issued from the radio wave communication unit, wherein, in a case where the light emission performed according to the light emission start instruction is a preliminary light emission, the control unit controls timing at which the imaging apparatus starts light metering so as to be synchronized with the preliminary light emission.

8. A communication apparatus capable of communicating with a light emitting apparatus using a radio wave, comprising:

a detection unit configured to detect a light emission start instruction issued from an imaging apparatus to the light emitting apparatus;

a radio wave communication unit configured to transmit data indicating the light emission start instruction based on the light emission start instruction detected by the detection unit to the light emitting apparatus;

an acquisition unit configured to acquire a first light emission delay time that the light emitting apparatus requires for a processing from completion of reception of the data indicating the light emission start instruction issued from the radio wave communication unit, to start of light emission; and an output unit configured to output, to the imaging apparatus, the first light emission delay time acquired by the acquisition unit, and a second light emission delay time required for the processing from detection of the light emission start instruction by the detection unit to completion of transmission of the data indicating the light emission start instruction issued from the radio wave communication unit, wherein the second light emission delay time finishes before the first light emission delay time appears.

9. A camera system including an imaging apparatus and a light emitting apparatus capable of communicating with each other via a radio wave communication unit using a radio wave, the camera system comprising:

a light emission start instruction unit configured to output a light emission start instruction addressed to the light emitting apparatus, to the radio wave communication unit;

an acquisition unit configured to acquire a first light emission delay time that the light emitting apparatus requires for a processing from completion of reception of data indicating the light emission start instruction issued from the radio wave communication unit to start of light emission; and a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit, to completion of transmission of the data indicating the light emission start instruction issued from the radio wave communication unit, wherein the second light emission delay time finishes before the light emission delay time appears.

10. A camera system including an imaging apparatus and a light emitting apparatus capable of communicating with each other via a radio wave communication unit using a radio wave, the camera system comprising:

a light emission start instruction unit configured to output a light emission start instruction addressed to the light emitting apparatus, to the radio wave communication unit;

an acquisition unit configured to acquire a first light emission delay time that the light emitting apparatus requires for a processing from completion of reception of data indicating the light emission start instruction issued from the radio wave communication unit to start of light emission;

a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit, to completion of transmission of the data indicating the light emission start instruction issued from the radio wave communication unit; and a calculation unit configured to calculate the second light emission delay time based on a communication speed and a number of communicated bytes when the radio wave communication unit transmits the data indicating the light emission start instruction.

11. A camera system including an imaging apparatus and a light emitting apparatus capable of communicating with each other via a radio wave communication unit using a radio wave, the camera system comprising:

a light emission start instruction unit configured to output a light emission start instruction addressed to the light emitting apparatus, to the radio wave communication unit;

an acquisition unit configured to acquire a first light emission delay time that the light emitting apparatus requires for a processing from completion of reception of data indicating the light emission start instruction issued from the radio wave communication unit to start of light emission; and a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit, to completion of transmission of the data indicating the light emission start instruction issued from the radio wave communication unit, wherein the acquisition unit acquires the second light emission delay time from the radio wave communication unit.

12. A camera system including an imaging apparatus and a light emitting apparatus capable of communicating with each other via a radio wave communication unit using a radio wave, the camera system comprising:

a light emission start instruction unit configured to output a light emission start instruction addressed to the light emitting apparatus, to the radio wave communication unit;

an acquisition unit configured to acquire a first light emission delay time that the light emitting apparatus requires for a processing from completion of reception of data indicating the light emission start instruction issued from the radio wave communication unit to start of light emission; and a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit, to completion of transmission of the data indicating the light emission start instruction issued from the radio wave communication unit, wherein, in a case where the light emission performed according to the light emission start instruction is a preliminary light emission, the control unit controls timing at which the imaging apparatus starts light metering so as to be synchronized with the preliminary light emission.

13. A camera system including an imaging apparatus and a light emitting apparatus that communicate via a radio wave communication unit using a radio wave, the camera system comprising:

a light emission start instruction unit configured to output a light emission start instruction addressed to the light emitting apparatus, to the radio wave communication unit;

an acquisition unit configured to acquire a first light emission delay time that the light emitting apparatus requires for a processing from completion of reception of data indicating the light emission start instruction issued from the radio wave communication unit to start of light emission; and a control unit configured to control timing at which the imaging apparatus starts an operation corresponding to the light emission performed according to the light emission start instruction based on the first light emission delay time acquired by the acquisition unit, and a second light emission delay time required for the processing from an output of the light emission start instruction issued from the light emission start instruction unit, to completion of transmission of the data indicating the light emission start instruction issued from the radio wave communication unit, wherein the second light emission delay time finishes before the first light emission delay time appears, wherein the imaging apparatus is an apparatus capable of performing optical communication with the light emitting apparatus via an optical communication unit using light, and wherein the control unit controls the timing at which the imaging apparatus starts an operation corresponding to the light emission performed according to the light emission start instruction at different timing depending on whether the light emission start instruction is issued to the light emitting apparatus via the radio wave communication unit or via the optical communication unit.

* * * * *